Sept. 6, 1966

W. R. MARTIN 3,270,549

FLUID METER CALIBRATING DEVICE

Filed Aug. 14, 1964

INVENTOR.
WILLIAM R. MARTIN
BY
Berman, Davidson & Berman
ATTORNEYS

Sept. 6, 1966  W. R. MARTIN  3,270,549
FLUID METER CALIBRATING DEVICE
Filed Aug. 14, 1964  2 Sheets-Sheet 2

INVENTOR.
WILLIAM R. MARTIN
BY
Berman, Davidson & Berman
ATTORNEYS

United States Patent Office 3,270,549
Patented Sept. 6, 1966

3,270,549
FLUID METER CALIBRATING DEVICE
William R. Martin, 1627 Beach Drive SE.,
St. Petersburg, Fla.
Filed Aug. 14, 1964, Ser. No. 389,749
7 Claims. (Cl. 73—3)

This invention relates to a device for checking the accuracy of the calibration of fluid pressure dispensing apparatus, such as metered liquid petroleum gas (LP) dispensing trucks and the like.

The primary object of the invention is the provision of a simple, practical, and easily used device of the kind indicated, which involves establishment of a pressure resistant oil cushion adapted to be simply and easily calibrated, a piston in a cylinder which communicates with the oil cushion, the cylinder being open to the pressure of the incoming dispensed gas and the piston being movable, against the resistance of the oil cushion, by the incoming gas, a first meter responsive to the movement of the piston, and a second meter responsive to the pressure of the incoming gas, the first meter being adapted to show the displacement of the oil cushion into a reservoir, with which the oil cushion is in communication, in inches, as a basis for conversion to true liquid measure.

Another object of the invention is the provision of a device of the character indicated above, wherein a pump is incorporated, between the oil reservoir and the part of the cylinder containing the oil cushion, for the purpose of moving the piston in a direction to return the gas therein to the source or dispensing apparatus.

Figures 1, 2, 3:
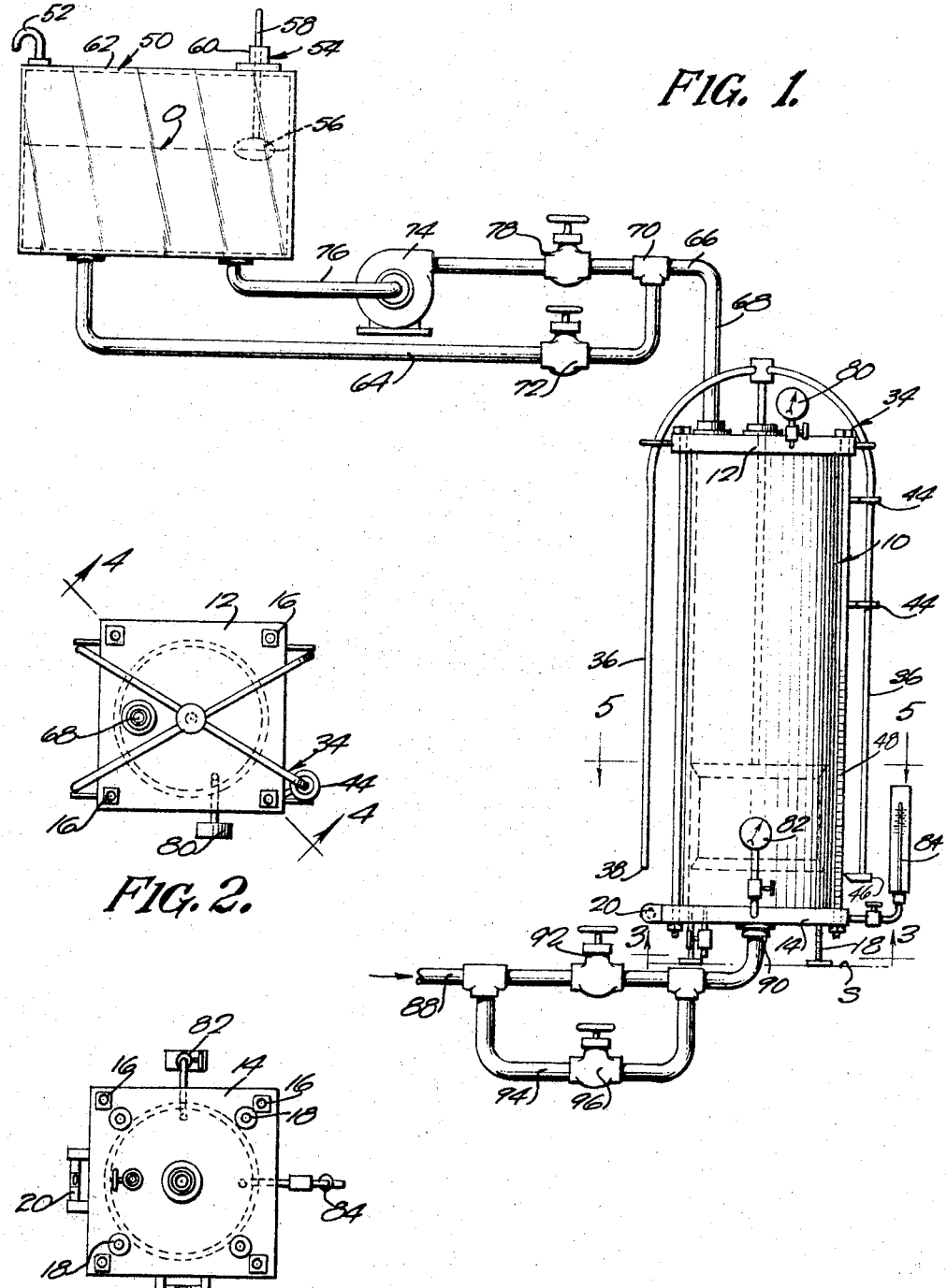
FIGURE 1 is a schematic view of a device of the invention, portions being in phantom lines.
FIGURE 2 is a top plan view of the cylinder of the device, a part being in section.
FIGURE 3 is a horizontal section taken on the line 3—3 of FIGURE 1.
Figure 4:
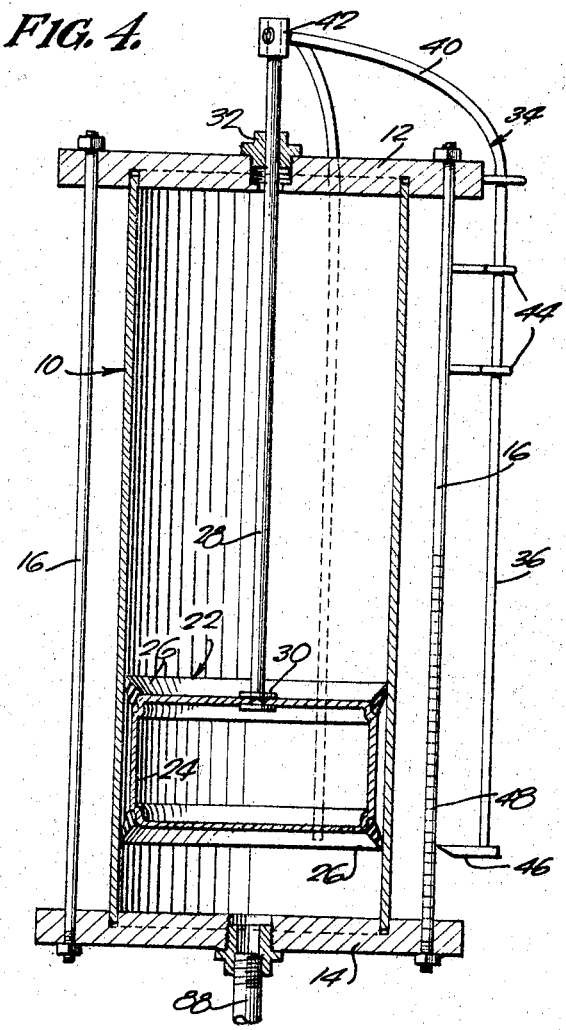
FIGURE 4 is an enlarged vertical transverse section, taken on the line 4—4 of FIGURE 2.
Figure 5:
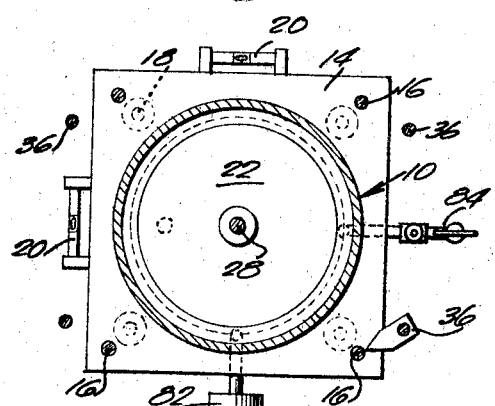
FIGURE 5 is an enlarged horizontal section, on a reduced scale as compared to FIGURE 4, taken on the line 5—5 of FIGURE 1.

Referring in detail to the drawings, the illustrated device comprises an upright open-ended cylinder 10 which is closed, at its upper and lower ends by upper and lower rectangular plates 12 and 14, respectively.

Bolts 16 extend through these plates, at their corners, and hold them in place. Vertically adjustable feet 18, extend downwardly from the lower plate 14, for leveling the cylinder 10 on a supporting surface S. Adjacent sides of the lower plate 14 are provided with horizontal bubble levels 20, spaced at 90° from each other and in right angular relationship, for checking the leveling of the cylinder.

A preferably hollow piston 22 has a cylindrical body 24, smaller in diameter than the bore of the cylinder 10, and provided with resilient oppositely angled sealing rings 26, around its upper and lower edges. An axial piston rod 28 is fixed, as indicated at 30, to the top of the piston 10, which, at its upper end, works through a packing gland 32, in the upper cylinder plate or head 12, and constitutes a component of a spider gauge, for measuring in inches the displacement of cushioning liquid, such as oil, which is present within the cylinder 10, above the piston 22.

The spider gauge 34 comprises a pair of intersecting, inverted U-shaped members having pendant perpendicular straight legs 36, having lower ends 38, spaced upwardly from the lower cylinder plate or head 14, and inwardly and upwardly bowed upper end portions 40 which are fixed, as indicated at 42, to the upper end of the piston rod 28. The legs 36 are disposed in pairs, at opposite sides of the cylinder 10, and outwardly of the bolts 16.

Vertically spaced loop guides 44 extend from the cylinder 10, below the upper head 12, through which one of the spider gauge legs 36 works. This particular leg has a horizontal, inwardly extending pointer 46, on its lower end, which refers to a vertical oil displacement measuring scale 48, on an adjacent bolt 16.

An oil reservoir 50, supported adjacent to and above the cylinder 10, has an air vent pipe 52, on its top, and an internal oil level float gauge 54, the latter comprising a float 56, sustained by oil O in the reservoir, and an upstanding calibrated gauge rod 58, which works through a fitting 60, on the top wall 62 of the reservoir.

An oil transfer pipe 64 leads from the bottom of the reservoir 50 through the upper head 12 of the cylinder 10, via the lateral arm 66, of an upstanding pipe 68, to which the transfer pipe 64 is connected, as indicated at 70. An adjustable valve 72, incorporated in the transfer pipe 64, is provided for controlling and adjusting the flow of oil from the cylinder 10, above the piston 22, to the reservoir, as the piston is forced upwardly, in order to determine this flow of oil and the accompanying resistance offered by the oil cushion generated by the upward movement of the piston.

The lateral arm 66 of the pipe 68 is connected to the output or discharge side of a rotary pump 74, whose intake side is connected, by a pipe 76, to the lower part of the reservoir 50. A shut-off valve 78 is incorporated in the arm 66, at a location between the pump 74 and the connection of the oil transfer pipe 64 with the lateral pipe arm 66.

The shut-off valve 78 is normally closed during a calibrating operation, so that the oil cushion, above the piston 22, and in the reservoir 50, and in the pipe 76, as far as the pump 74, is not affected by the pressure of the pump 74.

However, when a calibration operation has been completed, and it is desired to return to the source of gas, under pressure, the gas which is present in the cylinder 10, below the piston 22, the transfer pipe valve 72 is closed, the shut-off valve 78 is opened, and the pump 74 actuated, so that oil, from the reservoir 50 is forced into the cylinder, above the piston, and drives the piston downwardly so as to return this gas to the source.

An oil pressure gauge 80 is incorporated in the upper cylinder head 12, and is in communication with the interior of the cylinder 10, above the piston, and serves to show not only the pressure of the oil cushion, but the speed of travel of the piston 22.

The oil pressure gauge 80 is adapted to be read along with a gas pressure gauge 82, which is incorporated in the lower cylinder head 14 and is in communication with the interior of the cylinder 10, below the piston 22, so that the relative pressures above and below the piston, are obtained.

Also incorporated in the lower cylinder head 14, and in heat transfer relationship to the interior of the cylinder 10, below the piston 22, is a thermometer 84.

Gas, under pressure, from a source, such as an LP dispensing truck, enters the cylinder 10 through an input pipe 88, which enters the cylinder through the lower head 14, as indicated at 90. A shut-off valve 92 is incorporated in the pipe 88, near the cylinder 10.

A by-pass pipe 94 shunts the shut-off valve 92, and is connected to the input pipe 88, at opposite sides of the shut-off valve 92. The by-pass pipe 94 has a shut-off valve 96.

In returning LP gas from the cylinder 10, below the piston 22, to the source, as explained hereinabove, the input pipe vlave 92, which is adapted to be open during a calibration operation, is closed, and the by-pass pipe valve 96, which is closed during a calibration operation, is opened to pass the gas under pressure to the source.

For a standard 50 gallon calibration, the inside height of the cylinder 10 would be 72 inches, with an inside diameter of 16, and the piston 22 would have a height of 12 inches.

What is claimed is:

1. A device of the character described, comprising a closed cylinder having first and second ends, a piston working in said cylinder, a piston rod fixed to the piston and working through said first end of the cylinder, a vented oil reservoir, an oil transfer pipe leading from the reservoir through said first end, and providing for an oil cushion in the transfer pipe and in the cylinder between said first end and the piston, an external oil displacement gauge operatively connected to the piston rod, and a gas input pipe leading into the cylinder through said second end of the cylinder between the said second end of the cylinder and the piston, said input pipe being adapted to be connected to a meter-equipped source of gas under pressure.

2. A device according to claim 1, wherein said oil transfer pipe incorporates an adjustable valve adapted to be adjusted to determine the resistance to return of oil to the reservoir from said cushion as the piston is elevated by entry of gas under pressure into the cylinder.

3. A device according to claim 1, wherein said oil transfer pipe incorporates an adjustable valve adapted to be adjusted to determine the resistance to return of oil to the reservoir from said cushion as the piston is elevated by entry of gas under pressure into the cylinder, an oil pressure gauge communicating with the interior of the cylinder between said first head and the piston, and a gas pressure gauge communicating with the interior of the cylinder between the piston and the second head of the cylinder.

4. A device according to claim 1, wherein said oil transfer pipe incorporates an adjustable valve adapted to be adjusted to determine the resistance to return of oil to the reservoir from said cushion as the piston is elevated by entry of gas under pressure into the cylinder, a pump having an intake side connected to the reservoir and an output side, a pipe connected between said output side of the oil transfer pipe, at a point between the adjustable valve and the cylinder, and a shut-off valve incorporated in said pipe at a location between the pump and the cylinder, the pump being adapted to be actuated to force oil under pressure from the reservoir into the cylinder between the piston and the first end of the piston, with the shut-off valve open and the adjustable valve closed, for moving the piston toward the second end of the cylinder for returning gas under pressure from the cylinder to the source.

5. A device according to claim 1, wherein said oil transfer pipe incorporates an adjustable valve adapted to be adjusted to determine the resistance to return of oil to the reservoir from said cushion as the piston is elevated by entry of gas under pressure into the cylinder, a pump having an intake side connected to the reservoir and an output side, a pipe connected between said output side of the oil transfer pipe, at a point between the adjustable valve and the cylinder, and a shut-off valve incorporated in said pipe at a location between the pump and the cylinder, the pump being adapted to be actuated to force oil under pressure from the reservoir into the cylinder between the piston and the first end of the piston, with the shut-off valve open and the adjustable valve closed, for moving the piston toward the second end of the cylinder for returning gas under pressure from the cylinder to the source, said gas input pipe incorporating a shut-off valve, a by-pass pipe connected at its ends to the input pipe at opposite sides of the shut-off valve of the input pipe, said by-pass pipe incorporating a shut-off valve, the shut-off valve of the by-pass pipe being normally closed and being adapted to be opened only for return of gas to the source, the shut-off valve of the input pipe being normally open and adapted to be closed only during a return of gas to the source.

6. A device according to claim 1, wherein said oil transfer pipe incorporates an adjustablle valve adapted to be adjusted to determine the resistance to return of oil to the reservoir from said cushion as the piston is elevated by entry of gas under pressure into the cylinder, a pump having an intake side connected to the reservoir and an output side, a pipe connected between said output side of the oil transfer pipe, at a point between the adjustable valve and the cylinder, and a shut-off valve incorporated in said pipe at a location between the pump and the cylinder, the pump being adapted to be actuated to force oil under pressure from the reservoir into the cylinder between the piston and the first end of the piston, with the shut-off valve open and the adjustable valve closed, for moving the piston toward the second end of the cylinder for returning gas under pressure from the cylinder to the source, said gas input pipe incorporating a shut-off valve, a by-pass pipe connected at its ends to the input pipe at opposite sides of the shut-off valve of the input pipe, said by-pass pipe incorporating a shut-off valve, the shut-off valve of the by-pass pipe being normally closed and being adapted to be opened only for return of gas to the source, the shut-off valve of the input pipe being normally open and adapted to be closed only during a return of gas to the source, an oil pressure gauge communicating with the interior of the cylinder between the first end of the cylinder and the piston, and a gas pressure gauge communicating with the interior of the cylinder between the piston and the second end.

7. A device according to claim 1, wherein said oil displacement gauge comprises an inverted U-shaped member having pendant legs positioned alongside of the cylinder, said member being fixed at its upper end to the upper end of the piston rod, a vertical scale on a part of the cylinder, and a pointer on a leg of said member related to the scale.

References Cited by the Examiner
UNITED STATES PATENTS

| | | | |
|---|---|---|---|
| 2,792,705 | 5/1957 | Barrett | 73—3 |
| 2,809,666 | 10/1957 | Judd | 138—31 |
| 3,060,284 | 11/1962 | Ott | 73—3 |

LOUIS R. PRINCE, *Primary Examiner.*